June 25, 1963 N. V. BECKER 3,095,347

INSULATING MATERIAL AND THE LIKE

Filed Sept. 11, 1958

INVENTOR.
NORBERT V. BECKER

BY
ATTORNEY

3,095,347
INSULATING MATERIAL AND THE LIKE
Norbert V. Becker, Joliet, Ill., assignor to Johns-Manville Perlite Corporation, a corporation of Illinois
Filed Sept. 11, 1958, Ser. No. 760,294
1 Claim. (Cl. 162—181)

This invention relates to insulating materials such as acoustical tiles and the like.

The product comprises expanded perlite bonded together by fibers and a plurality of binders which cooperate to give the board properties not obtainable by any one of the binders alone. It possesses an unusual combination of desirable properties: it has a superior noise reduction coefficient (NRC); it is incombustible and moisture and abrasion resistant, with a good paint receiving surface; and is light in weight.

The invention is an improvement over that disclosed in copending Denning application Serial 535,305, now U.S. Patent No. 3,042,578.

Figure 1:
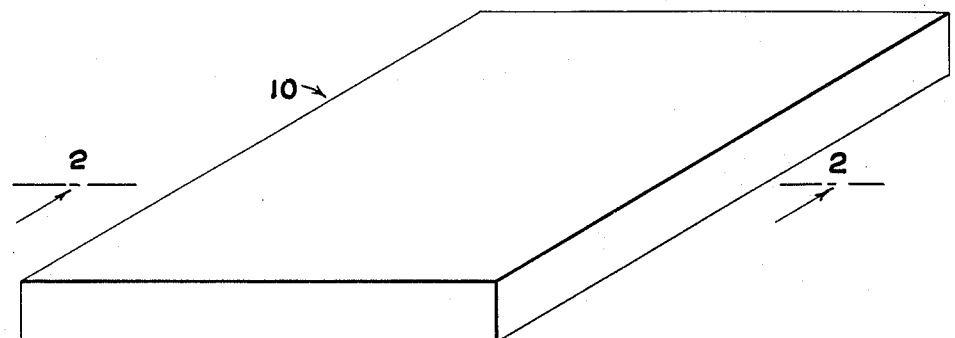
Figure 2:
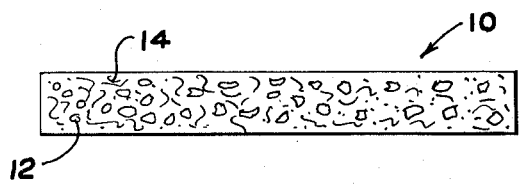

The nature of the invention and further details thereof may be readily understood by reference to one illustrative material embodying the invention and described in the following specification, to the accompanying drawing, wherein:

FIG. 1 is a pictorial representation of a board formed according to the present invention; and FIG. 2 is a sectional view taken on lines 2—2 of FIG. 1.

The conventional acoustical tile must have pores or voids open to receive and absorb sound waves. Most acoustical materials are relatively soft and friable and are not abrasion resistant, and are difficult to clean and paint. This has confined their use to ceilings and the upper portions of walls where they cannot be touched by many hands. Most of such materials are not incombustible or moisture resistant.

Reference to the material as a "title" is not intended to limit it to any size or shape; the term is here used in a generic sense to designate a sound or thermal insulating product generally. Many acoustical products are of tile dimensions, but the invention is not limited to size or shape of the product.

The illustrative product 10, shown in FIGS. 1 and 2 of the drawings, comprises expanded perlite 12 bonded together by fiber 14 and a plurality of binders which cooperate to give the product unusual and unexpected properties. Expanded perlite is of course incombustible and the generally spherical shape of its particles contributes to the porosity and sound absorbing or insulating properties of the product. The perlite is surrounded by a network of fiber and the fiber and perlite are bonded together by a combination of sodium silicate and so called shrinking binders such as bentonite and starch. All of these materials except the starch (and possibly the fiber, if a vegetable fiber be used instead of a mineral fiber) are non-combustible, but both the starch and the fiber are used in such small amounts and are so well surrounded and isolated by the perlite and bentonite, that the product will not support combustion. The bentonite although used in relatively small amounts is very highly colloidal and so thoroughly coats the fibers etc., that it and the perlite isolate the combustible materials to prevent transmission of combustion in the product.

One illustrative product comprises:

| | Percent |
|---|---|
| Expanded perlite | 60–75 |
| Fiber | 15–21 |
| Sodium silicate | 2–7 |
| Bentonite | 8–2 |
| Starch | 15–7 |

The fiber may advantageously be pulped news print, but mineral fiber such as asbestos, rock wool, etc. may be used. Both the bentonite and the starch swell in absorbing large amounts of water which when removed on drying leaves the bentonite and starch highly porous to improve sound absorption and reduce weight but without impairing their efficiency as binders.

Sodium silicate slightly migrates to the surface to toughen the surface to give it resistance to abrasion and indentation and to provide a superior painting surface. As explained in said copending Denning application, there is a reaction between the sodium silicate and the perlite which greatly reduces the heretofore objectionable tendency of substantially all of the sodium silicate to migrate to the surface on drying, thereby depriving the interior of the product of its function as a binder. Upon reaction with the perlite, there is only a very little migration to the surface, and such migration as occurs, is desirous for the reasons stated above.

The product is advantageously made by the wet process in which the solid constituents are mixed in an aqueous slurry which is then molded and dewatered by various methods such as Fourdrinier or cylinder machines, or in a suction or similar mold. After forming, the material is dried and trimmed and cut to size.

In formation by the wet process where the solids comprise only a few percent, it is advantageous though not essential to use a cationic starch, that is one having a positive charge on the ion. Since the fiber e.g. paper fiber, has a negative charge, the starch and fiber cling together more firmly than the common variety of starch and fiber, with the result that less starch is carried out with the water on dewatering. This permits the use of a freer furnish (i.e. one having a lower percentage of solids) without risking loss of starch on dewatering. However modern starches have been greatly improved over ordinary starch as regards the ability of the starch to cling to the fiber. Generally it is advisable to recover and re-use the water to save binding constituents carried away with the water.

For use as an acoustical material, the tile or other forms of the product are preferably drilled or punched in the conventional manner to facilitate access of sound waves into and absorption by the interior of the product. But, for other purposes, the formed product may be used without perforating, since it is an excellent insulation board which is abrasion and indentation resistant and can be readily decorated.

A product comprising the following constituents:

| | Percent weight per cu. ft. |
|---|---|
| Perlite | 68 |
| Fiber (news print) | 17 |
| Sodium silicate | 3 |
| Bentonite | 3 |
| Starch | 9 | has the following physical properties:

Weight per cu. ft.____ 8.5 pounds.
Modulous of rupture 140 pounds per sq. in.
NRC_____ .70 for a product of ¾" thickness.

The combination of bentonite and starch as binders results in a better NRC than when using either bentonite or starch alone. For example, the NRC of the above product is at least 5 decibels above any similar product made with only one of the above binders; and it is from 1 to 3 pounds lighter per cubic foot than a similar product made with any one of the above binders.

It is to be understood that variations and modifications of the present invention may be made without departing from the spirit of the invention. It also is to be understood that the scope of the invention is not to be interpreted disclosed herein but only in accordance with the appended claim, when read in the light of the foregoing disclosure.

Having described my invention, I claim:

An insulating board comprising in combination 60 to 75 percent of expanded perlite enmeshed in a network of 15 to 21 percent fiber and bonded together with binding material consisting essentially of 2 to 7 percent sodium silicate, 2–8% bentonite, and 15–7% starch.

References Cited in the file of this patent

UNITED STATES PATENTS

| | | |
|---|---|---|
| 2,462,255 | Charman et al. | Feb. 22, 1949 |
| 2,580,076 | Deane | Dec. 25, 1951 |
| 2,626,864 | Miscall | Jan. 27, 1953 |
| 2,634,207 | Miscall | Apr. 7, 1953 |
| 2,634,208 | Miscall | Apr. 7, 1953 |
| 2,699,097 | Binkley | Jan. 11, 1955 |
| 2,705,198 | Seybold | Mar. 29, 1955 |
| 2,971,878 | Heilman et al. | Feb. 14, 1961 |